United States Patent
Leman

(10) Patent No.: US 6,307,739 B1
(45) Date of Patent: *Oct. 23, 2001

(54) COMPUTER SYSTEM FORM FACTOR

(75) Inventor: Michael V. Leman, Eagle, ID (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,813

(22) Filed: May 18, 1999

(51) Int. Cl.[7] .................................................... G06F 1/16
(52) U.S. Cl. .......................... 361/683; 361/679; 361/680; 361/684; 400/472; 400/480; 400/481; 400/496; 400/714; 200/302.1; 200/302.2; 200/304; 200/305
(58) Field of Search .................................... 361/379, 683, 361/680, 684; 400/714, 496, 472, 480, 481; 200/302.1, 302.2, 304, 305

(56) References Cited

U.S. PATENT DOCUMENTS 5,697,718 * 12/1997 Erler et al. ............................ 400/714

* cited by examiner

Primary Examiner—Leo P. Picard
Assistant Examiner—Yean-Hsi Chang
(74) Attorney, Agent, or Firm—Trop, Pruner & Hu, P.C.

(57) ABSTRACT

A form factor for use in the manufacture of a portable computer includes a U-shaped member having at least two distinct elements attached together. In one form factor, the U-shaped member includes two distinct elements: a unitary wall element having a first wall, a second wall, and at least one spacing element to physically separate the first and second walls; and a base element attached to one end surface of the wall element. In another form factor, the U-shaped member includes three distinct elements: a first wall element; a second wall element; and a base element attached to the first and second wall elements. The form factors may also include bosses to facilitate the attachment of computer system components such as printed circuit boards, storage units, and battery units.

19 Claims, 6 Drawing Sheets

COMPUTER SYSTEM FORM FACTOR

BACKGROUND

The invention relates generally to the assembly of computer systems and, more particularly but not by way of limitation, to a structure for the manufacture and assembly of portable computer systems.

As the size of semiconductor devices and various other computer components has decreased, computer manufacturers have provided smaller computer systems having the same or improved computational abilities as their larger predecessors. Notebook computers, for example, may typically be 21.6 cm (8½ in.) in width, 27.9 cm (11 in.) in length, and 3.8 cm to 6.4 cm (1½ to 2½ in.) in height, thus occupying approximately 603 sq. cm. of desktop area. An equally functional desktop computer may have a length of 39.4 cm (15½ in.), a width of 47 cm (18½ in.), and a height of 12.7 cm to 17.8 cm (5 to 7 in.) requiring 1,851 sq. cm ( 287 sq. inches) of desktop area.

While relatively small, portable computer systems typically provide many of the same features provided in their desktop-sized counterparts. For example, many modern notebook computer systems are equipped with relatively large amounts of on-board memory, floppy, hard, and optical disk storage units, display screens, at least one expansion slot, and standard input/output ports. Additional features, such as built-in modems, computer network cards, sound cards, and the like may also be included. In light of (or perhaps in spite of) recent advances in the fields of electronics and manufacturing, users demand increased computational capability in ever smaller and lighter computer systems.

Referring to FIG. 1, a cross-sectional view of a typical plastic or die cast housing or form factor 100 used to manufacture a portable (e.g., a notebook) computer system is shown. Electrical components (e.g., power regulators) and structural support elements (e.g., motherboard and storage unit mounting assemblies) are generally attached to form factor 100 via boss 102. To provide the necessary strength and facilitate manufacturability, wall thickness 102 is generally between approximately 1 and 3 millimeters (mm). While state or the art injection molding techniques may reduce wall thickness 102 to approximately 1 mm, it has not been possible to manufacture thinner form factors that provide the necessary structural strength. Thus, it would be beneficial to provide a form factor that allows the manufacture of smaller (in terms of height, and/or width, and/or depth) and/or lighter portable computer systems.

SUMMARY

The invention provides a form factor for the manufacture of portable computers. The form factor includes a U-shaped member having at least two distinct elements attached together. In one embodiment, the U-shaped member comprises two distinct elements: a unitary wall element having a first wall, a second wall, and at least one spacing element to physically separate the first and second walls; and a base element attached to one end surface of the wall element. In another embodiment, the U-shaped member comprises three distinct elements: a first wall element; a second wall element; and a base element attached to the first and second wall elements. Form factors in accordance with the invention may also include bosses to facilitate the attachment of computer system components such as printed circuit boards, storage units, and battery units.

DETAILED DESCRIPTION

A form factor for the manufacture and assembly of portable computer systems is described. The following embodiments of the invention, described in terms of a notebook computer system, are illustrative only and are not to be considered limiting in any respect.

Figure 1:
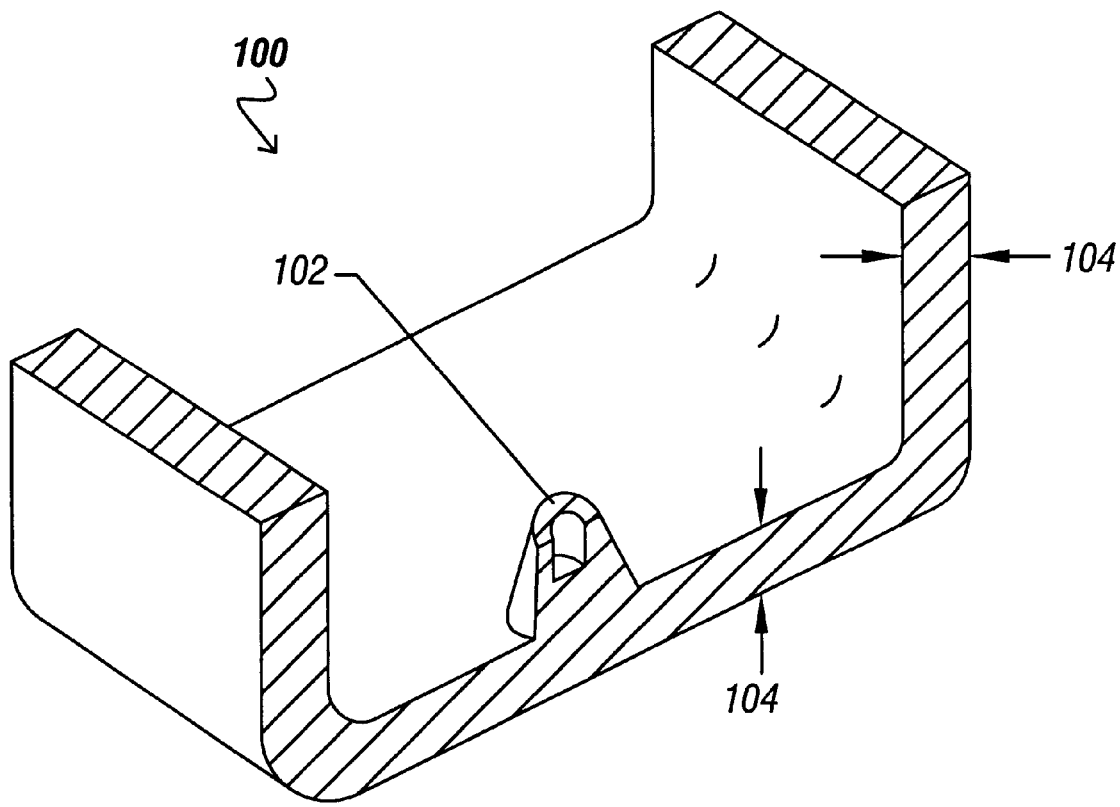
FIG. 1 shows a cross-sectional view of a prior art form factor used to manufacture a portable computer system.
Figure 2:
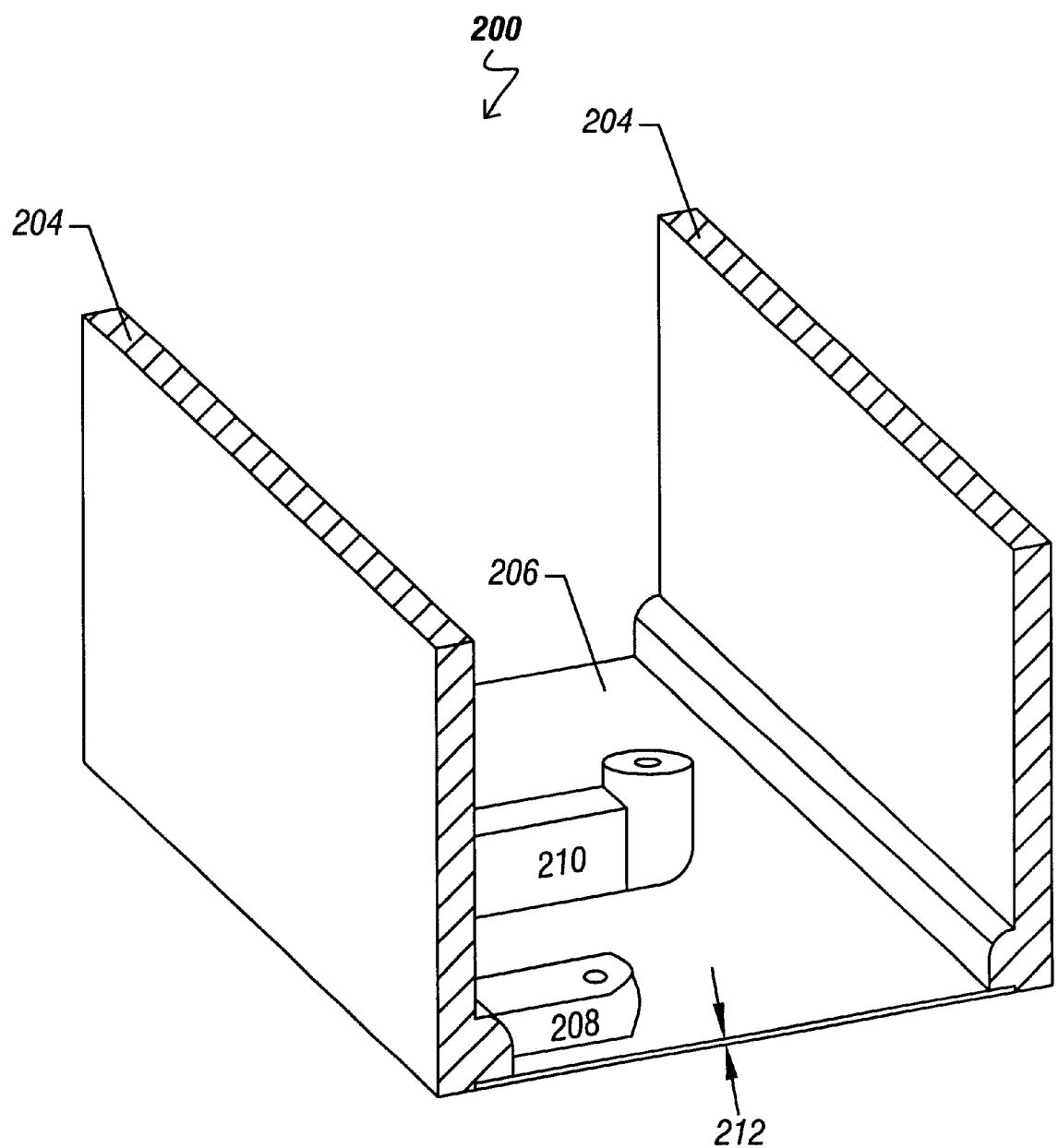
FIG. 2 shows an isometric view of a form factor in accordance with one embodiment of the invention.

Referring to FIG. 2 an assembly structure or form factor 200 in accordance with one embodiment of the invention is shown. As illustrated, form factor 200 includes a first wall 202, a second wall 204, a base 206 and one or more bosses to which electronic and/or structural components may be attached. Two exemplar types of bosses are shown: flat boss 208 and raised boss 210. Either or both types of boss may be used in a form factor. In one embodiment, base 206 may be a sheet metal member between approximately 0.2 and 0.5 mm in thickness that is laminated to first wall 202 and second wall 204. In another embodiment, base 206 may be made of a composite material such as, for example, carbon fiber or KEVLAR®. In general, base 206 may be any material that provides the necessary structural strength when fashioned into a thin sheet. Further, base 206 may be attached to walls 202 and 204 by, for example, glue, screws, rivets, and the like.

Figure 3:
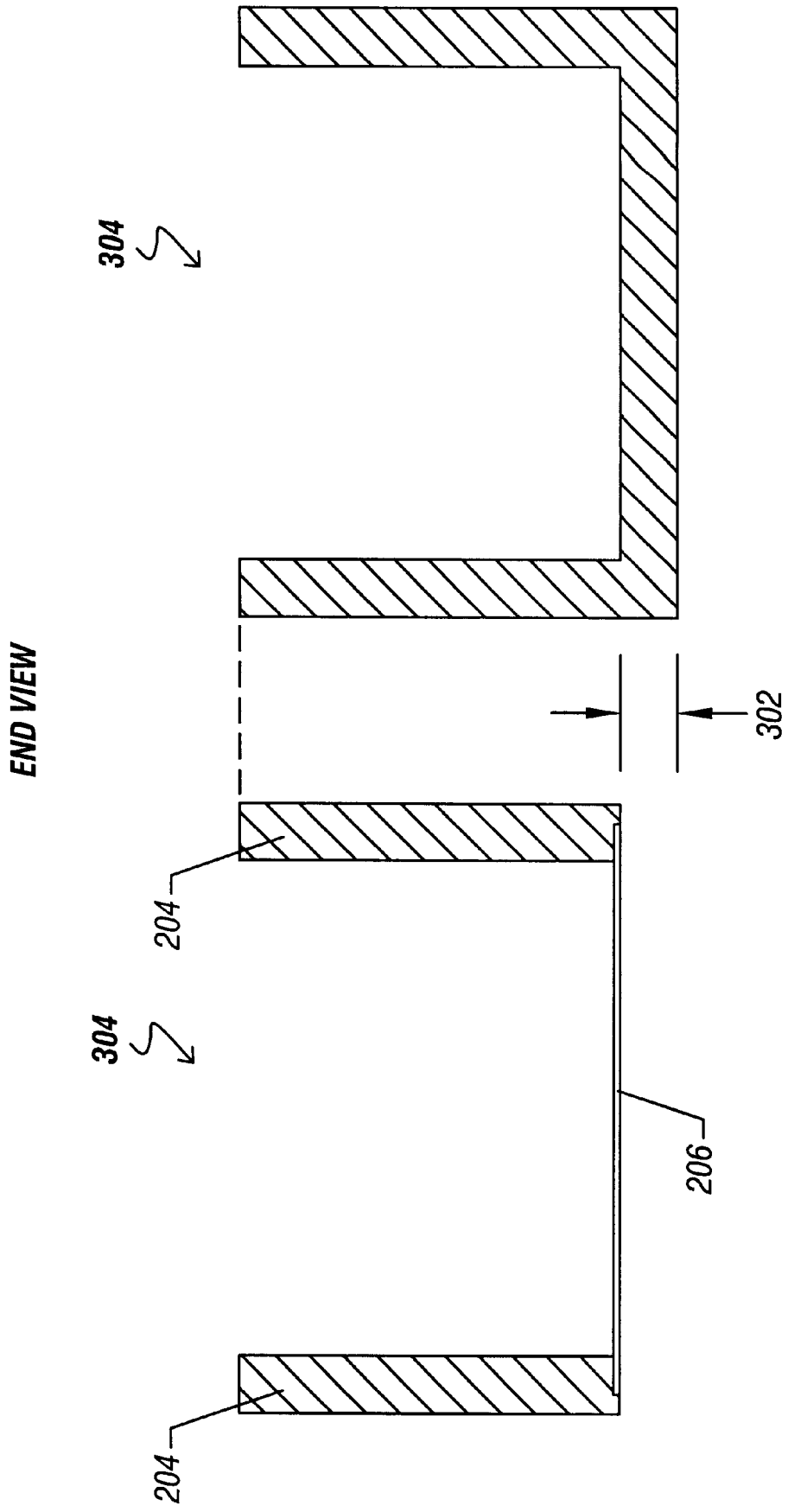
FIG. 3 illustrates the reduced height of a form factor made in accordance with the invention over a conventional form factor.

Referring to FIG. 3, form factor 300 in accordance with the invention provides a form factor that is between approximately 0.5 and 1.5 mm thinner (denoted as 302) than typical prior art form factor 304. This, in turn, allows a portable computer to be between 0.5 and 1.5 mm thinner—a potentially significant benefit in the marketplace. In addition, base 206 may be made of a material which is lighter than a conventional (e.g., 3 mm thick) form factor bottom surface, thereby providing not only a thinner, but also a lighter form factor and, therefore, the manufacture of a lighter portable computer system.

Figure 4A:
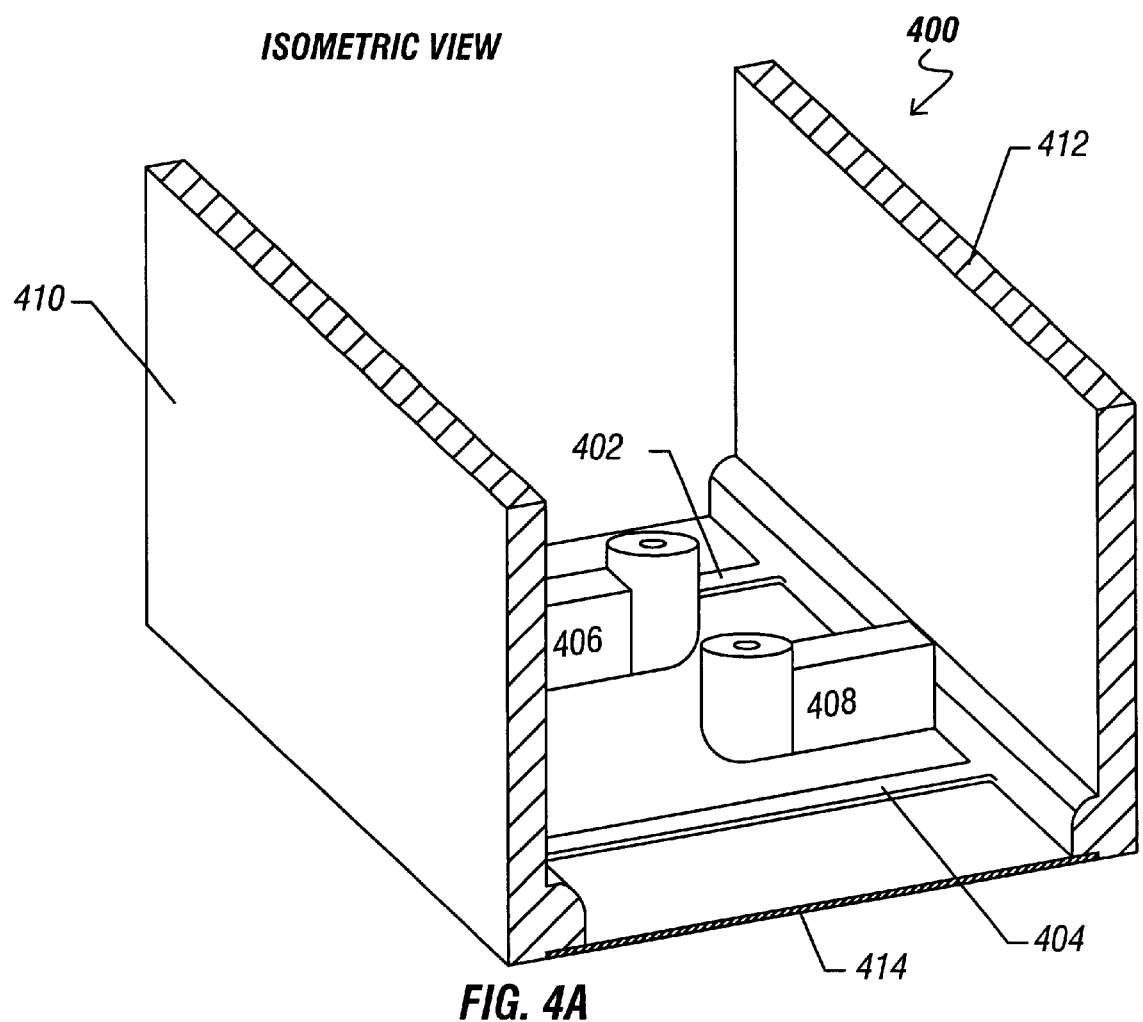
FIGS. 4A and 4B show isometric and top views respectively of a form factor in accordance with another embodiment of the invention.
Figure 4B:
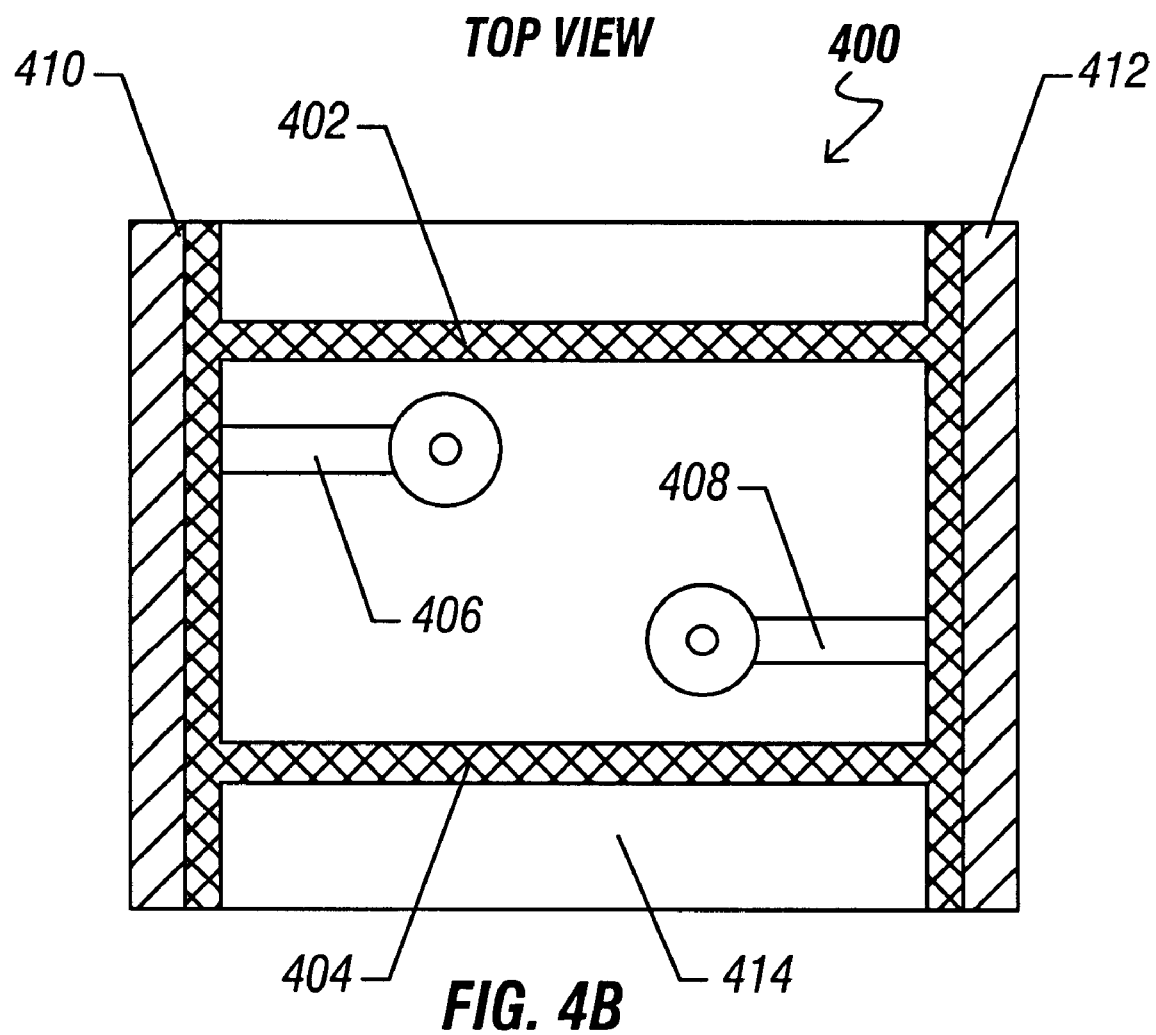

Referring to FIGS. 4A and 4B, in another embodiment of the invention form factor 400 may use one or more connective members (402 and 404, for example) in addition to one or more bosses (e.g., 406 and 408). Connective members such as 402 and 404 may be used to maintain a specified separation between first wall 410 and second wall 412 to facilitate the inclusion of base 414. As shown, connective members and walls may constitute an integral unit. For example, connective members 402 and 404 and walls 410 and 412 may constitute a single plastic element. Because connective members (e.g., member 402) do not need to provide structural strength, they need only be as thick as needed to facilitate manufacture. Thus, form factor 400 provides the reduced height and weight of form factor 200 while also easing the form factor's assembly.

Figure 5:
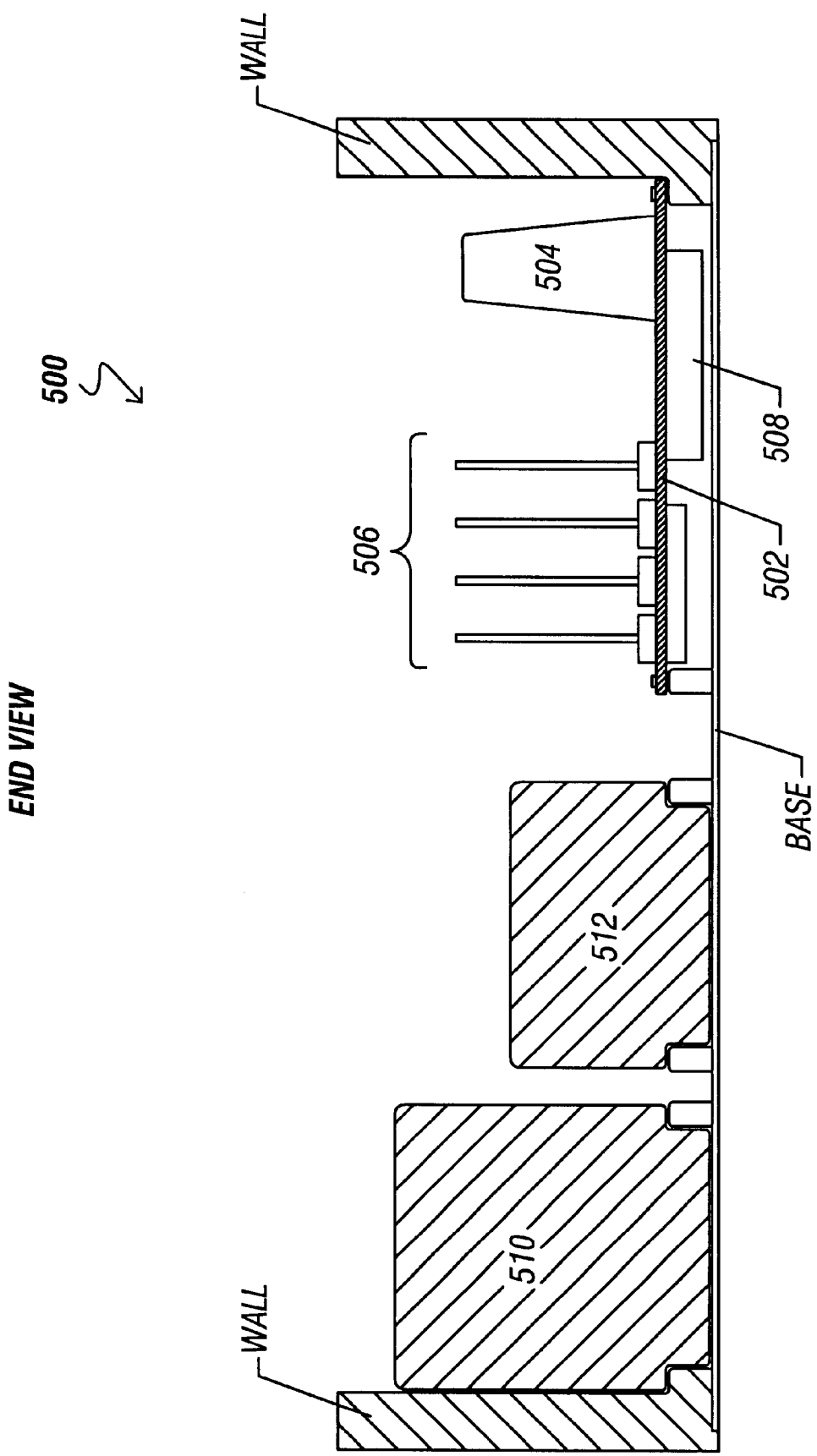
FIG. 5 shows a computer system formed within a form factor in accordance with the invention.

Referring to FIG. 5, a form factor in accordance with the invention 500 may provide the structure within which a portable computer system may be constructed. For example, printed circuit board 502 (e.g., a computer system motherboard) and associated components such as a central processing unit 504, system memory modules 506 and other circuitry (e.g., 508) may be attached to form factor 500. In addition, other functional components such as storage unit 510 (e.g., floppy, fixed, or removable disk unit) and battery 512 may be attached to form factor 500.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A portable computer assembly structure comprising:
   a first plastic wall member having a thickness of between approximately 1 millimeters and 3 millimeters;
   a second plastic wall member having a thickness of between approximately 1 millimeter and 3 millimeters and 3 millimeters;
   a base member having a thickness of between approximately 0.2 millimeters and 1 millimeter attached to an end surface of the first and second wall members, the base member being a different material than the first and second wall members; and
   boss members to attach electrical components to the structure, each boss member extending from one of the first and second plastic wall members and being supported by the base member.

2. The portable computer assembly structure of claim 1, wherein the base member comprises sheet metal.

3. The portable computer assembly structure of claim 1, wherein the base member comprises carbon fiber material.

4. The portable computer assembly structure of claim 1, wherein the base member comprises KEVLAR.

5. The portable computer assembly structure of claim 1, wherein the base member is laminated to the first and second wall members.

6. The portable computer assembly structure of claim 1, further comprising a spacer member to maintain a specified separation between said first and second wall members.

7. The portable computer assembly structure of claim 6, wherein the spacer member is continuous with, and is the same material as, the first wall member.

8. The portable computer assembly structure of claim 1, further comprising a boss adapted to attach to an electrical component.

9. The portable computer assembly structure of claim 8, wherein the boss is continuous with, and is the same material as, the first wall member.

10. The portable computer assembly structure of claim 8, wherein the electrical component comprises a printed circuit board.

11. The portable computer assembly structure of claim 8, wherein the electrical component comprises a storage unit.

12. The portable computer assembly structure of claim 8, wherein the electrical component comprises a battery.

13. A portable computer form factor comprising:
    first and second wall members composed of a first material having a first thickness;
    a base member attached to an end surface of each of the first and second wall members and being made of a material different from the first material and having a thickness substantially less that said first thickness; and
    boss members to attach electrical components to the form factor, each boss member extending from one of the first and second wall members and being supported by the base member.

14. The portable computer form factor of claim 13, wherein the base member material has a substantially higher strength per unit volume than the first and second wall members.

15. The portable computer form factor of claim 13, wherein the first and second wall members comprise plastic and the base member comprises sheet metal.

16. The portable computer form factor of claim 15 wherein the first thickness is between approximately 1 millimeter and 3 millimeter, and the thickness of the base member is between approximately 0.2 and 0.5 millimeters.

17. A notebook computer system comprising:
    a form factor having a U-shaped cross-section and comprising first and second wall members, a base member and bosses to attach electrical components to the form factor, each boss extending from one of the first and second wall members and being supported by the base member; and
    a printed circuit board attached to the form factor, the printed circuit board adapted to accept a central processing unit and at least one memory module.

18. The notebook computer system of claim 17, wherein the U-shaped form factor comprises:
    walls having a first thickness; and
    a base attached to an end surface of the walls and having a thickness that is substantially less than the thickness of the walls.

19. The notebook computer system of claim 18, wherein the walls comprise plastic and the base comprises sheet metal.

* * * * *

UNITED STATES PATENT AND TRADEMARK OFFICE
CERTIFICATE OF CORRECTION

PATENT NO.    : 6,307,739 B1
DATED         : October 23, 2001
INVENTOR(S)   : Michael V. Leman It is certified that error appears in the above-identified patent and that said Letters Patent is hereby corrected as shown below:

<u>Column 3,</u>
Line 17, "and 3 milimeters and 3 milimeters" should be -- and 3 milimeters --.

Signed and Sealed this

Twenty-sixth Day of March, 2002

Attest:

Attesting Officer

JAMES E. ROGAN
*Director of the United States Patent and Trademark Office*